Feb. 4, 1947.  S. C. HURLEY, JR  2,415,175
PHOTOELECTRIC GAUGING OF FLEXIBLE TUBULAR CASINGS
Filed June 15, 1944
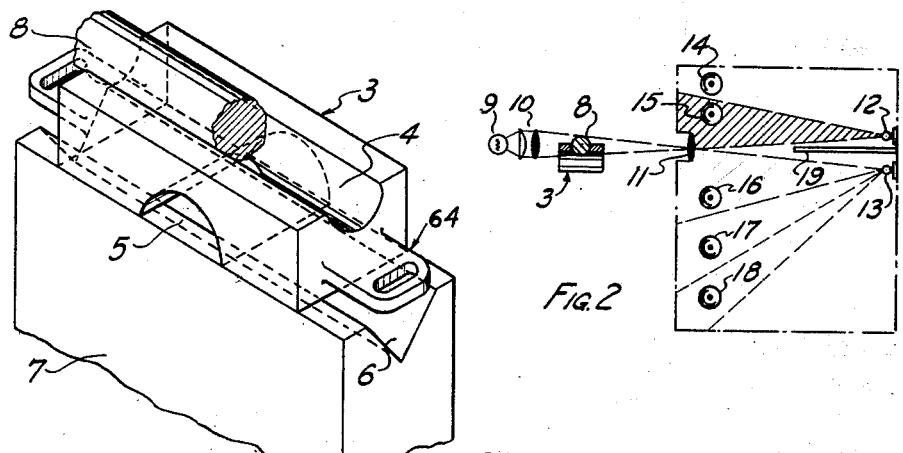
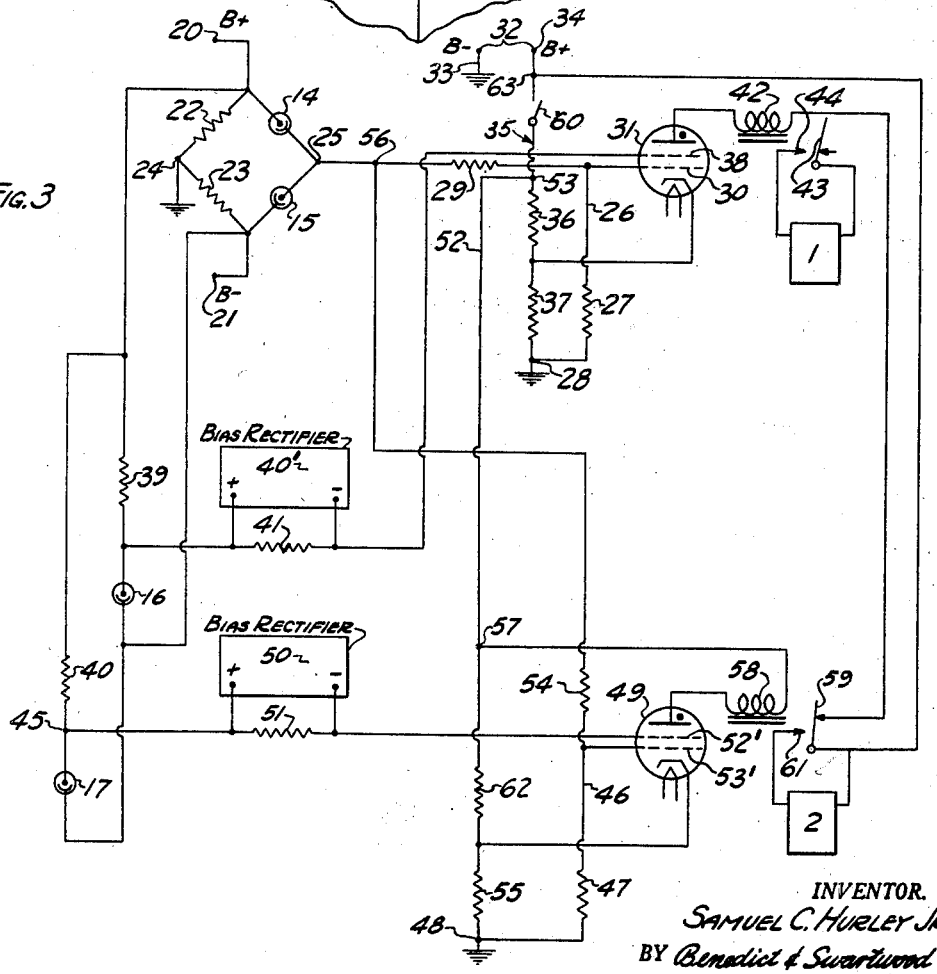
INVENTOR.
SAMUEL C. HURLEY JR.
BY Benedict & Swartwood
ATTORNEYS

UNITED STATES PATENT OFFICE 2,415,175

PHOTOELECTRIC GAUGING OF FLEXIBLE TUBULAR CASINGS

Samuel C. Hurley, Jr., Danville, Ill.

Application June 15, 1944, Serial No. 540,513

1 Claim. (Cl. 88—14)

This invention relates to an improved apparatus for inspecting flexible tubular casings, and more particularly a photoelectric sizing mechanism which will measure and indicate the diameter of the flexible casings by photoelectric gauging.

My invention is suitable for measuring and indicating the diameter of any flexible casing and is especially suitable for indicating the size of sausage casings and the like. The sausage casings tested may be either synthetic or made of animal intestines.

It is an object of the invention to compare the diameter of sausage casings with a standard casing. This object is accomplished by inflating the casing with either a liquid or gas, depending upon the type of casing, and passing the casing through a beam of light such that a shadow image of the casing will be projected on a plurality of phototubes. The phototubes are connected in an electronic circuit such that the said phototubes will indicate whether or not the casing conforms to the standard casing.

Although either phototubes or photocells may be used in my invention, phototubes are preferable when used in conjunction with amplifiers. When photocells are used, it is preferable to eliminate the amplifiers and the photocells are connected in a conventional manner directly to the indicating or selecting means. However, any photoelectric device may be used.

In general, the inspection apparatus comprises an optical system for projecting a shadow image of the object to be measured and an indicating means for indicating different diameters of tubular objects or casings.

A more specific embodiment of the invention comprises means for passing an inflated tubular casing maintained under a proper inflated tension past a source of light, means for projecting a shadow image of the object, a pair of light sensitive devices spaced properly from said projecting means to receive the image of the lower edge of the object which indicates when the object is in proper test position, additional phototubes spaced properly from said projecting means to receive the image of the upper edge of said object in order to indicate the diameter, and means for indicating the state of illumination of the phototubes.

There are many advantages of my invention over previous methods for inspection of tubular casings and the like. In my invention, there are no mechanical parts in the actual inspection device which are subject to wear and corrosion, and by use of photoelectric gauging, I avoid use of mechanical stops. Casings made of animal intestines contain corrosive substances such as salts, fatty acids, etc., which corrode any inspection device coming directly in contact with the casing. If jets of water or other fluid media are projected over the surface of the natural casing to actuate a switch for determining the size of said casing, the fluid dissolves the corrosive material and said material ruins the switching mechanism. Furthermore, the use of a jet of liquid passing over the surface of the casing is not as accurate as the method used in my invention which comprises passing a beam of light over one surface of the inflated casing which casts a shadow on certain of the photoelectric tubes or cells. An additional advantage over mechanical or fluid inspection devices is that by my device I can measure a large number of different diameter casings in the same apparatus without changing any setting which is extremely difficult if not impossible to do with mechanical or fluid inspection devices.

Other objects and advantages of my invention will appear in the following description of the preferred embodiments of the invention shown in the attached drawing in which:

Fig. 1 is a perspective drawing showing the mechanical arrangement of the inspection device including a drainage table.

Fig. 2 illustrates the schematic arrangement of the optical system and the placement of the phototubes.

Fig. 3 illustrates one method of arrangement of the photoelectric wiring.

Referring to the drawing, the device illustrated in Fig. 1 includes an inspection block 3 containing an inspection or guiding trough 4 and inspection tunnel or port 5. The inspection block 3 may be made out of stainless steel, plastic, glass or other non-corrosive material obtainable on the market or it may be lined with such material. Due to the corrosive nature of the material dissolved in the liquid when liquid is used as an inflating medium which may leak out of the casing, especially when animal casings are being tested, water from a source (not shown) may be continuously flowed over the casing and overflow drained into the drain trough 6 in table 7. Said table also may be used as a support for inspection block 3. The casing 8 to be inspected, properly inflated, as will be described later, is shown in the inspection position in the guiding trough 4. Inspection tunnel or port 5 is constructed and adapted to permit the lower edge of the casing to be placed in a light beam, as will be described later, thus enabling the image of said lower edge of the casing to be cast on the phototubes used to indicate when the casing is in proper inspection position. Handles 64 are attached to the inspection block 3 to serve both for moving the inspection block about and as a rest or guide for the operator to maintain the casings in proper position for inspection. The handles may be movably attached to the inspection block in order to actuate a circuit-breaking switch, as will be described later, although such means are not shown on the drawing.

Referring to Fig. 2, any suitable source of light, shown as an incandescent lamp 9, may be used. The lamp 9 has its filament positioned substantially on the optical axis of a pair of condenser lenses 10 for concentrating the light from source 9 upon the tubular casing 8.

A projecting lens 11 is arranged so as to have its optical axis in alignment with the optical axis of the condensing lenses 10 and is positioned upon the opposite side of the test or inspection zone through which the tubular casing 8 is passed. The projecting lens 11 preferably projects a sharply defined shadow of the casing to be inspected upon convex mirrors 12 and 13. Diverging mirrors 12 and 13 are shown as convex, although other suitable diverging mirrors may be used. Mirror 12 is arranged in conjunction with phototubes 14 and 15 so that a shadow of the lower edge of the casing is cast upon mirror 12 from which it is reflected to phototubes 14 and 15. Phototubes 14 and 15 are arranged in respect to the optical system such that tube 15 is in shadow and 14 is in light when casing 8 is in proper inspecting position. Thus phototubes 14 and 15 are not used to indicate the size of the casing, but are used merely to indicate when the casing 8 is in proper inspection position within a predetermined tolerance range.

Mirror 13 is arranged to receive a shadow image of the upper edge of the casing which is reflected on one or more of the phototubes 16, 17, and 18, which are used to indicate the diameter of the flexible casing. These tubes are arranged in respect to the optical system such that phototube 16 is in shadow when the smallest casing 8 to be measured is in spection position while tube 17 remains light. Tube 17 is placed in shadow when the next size casing is in the testing zone. Similarly, 18 is in shadow when the next size casing is placed in the inspection zone.

Although only three phototubes, 16, 17, and 18, are shown for measuring casings of different diameters, any number of them may be used—depending upon the number of different diameters it is desired to test. Generally, one photoelectric tube is needed for each diameter to be measured. By a proper choice of projecting lens 11, the distance between projecting lens 11 and the photoelectric cells and the number and spacing of the latter, any number of different diameters of casings may be measured at any specified increments of diameter. If a large number of different diameters are to be tested, the spacing between projecting lens 11 and the photoelectric tubes will have to be greater and the projection lens 11 larger in order that the image of casing 8 will be projected on the proper tube.

If large increments in diameter are desired to be measured using a lens 11, having given optical characteristics, the tubes 16, 17, 18, etc., will be spaced farther apart; or the same result may be accomplished by keeping the same spacing between the tubes 16, 17, and 18 and varying the optical characteristics of the projection lens 11 or by varying the size and light diverging qualities of the mirrors 12 and 13.

It is also within the scope of my invention to arrange the photoelectric tubes or any suitable light sensitive device in such a manner as to inspect relatively small increments in diameter in a relatively small diameter range and relatively large increments in diameter in a relatively large diameter range, or vice versa. In other words, by properly spacing the tubes 16, 17, and 18, an inspection may be made for varying increments in diameter for different sized casings. The variation in increments measured need not be regular or constant.

A screen or shield 19 is provided to prevent any light reflected from mirror 12 being cast upon phototubes 16, 17, and 18 and to prevent any light from mirror 13 being cast on tubes 14 and 15.

Although I have shown one optical arrangement including a source of light and phototubes, any other may be used which will accomplish the objects of my invention. Fig. 3 illustrates a circuit which may be used to indicate the state of illumination of the phototubes 14, 15, 16, and 17. Phototube 18 is not shown in this circuit since it is sufficient for the purpose of illustration to show only tubes 16 and 17 which measure two different sizes. When additional sizes are tested, additional circuits similar to those used for tubes 16 and 17 may be employed.

When no casing is in inspection position, tubes 14, 15, 16, and 17 are in light. When the smallest diameter casing desired to be tested is properly positioned in the test zone, phototube 14 is in light, and phototubes 15 and 16 are in shadow, phototube 17 remaining in light. When the next size casing desired to be tested is in the proper testing position, phototube 14 is in light, 15 is dark, and 16 and 17 are dark. Thus tubes 14 and 15 are positioned and arranged for gauging the lower edge of the casing so as to indicate when it is in proper inspection position while tubes 16, 17, etc., are used to determine the size of the casing.

Fig. 3 also illustrates means for independently controlling the grids of a gas-filled tube to prevent its ionization unless the casing is properly placed for inspection and unless the proper tube for indicating the size is darkened by the image of the upper edge of the casing. Unless these requirements are met, the gas-filled tube will not ionize and, the indicating means will not be actuated.

Referring to Fig. 3, a suitable source of direct current is provided with its positive terminal connected at point 20 and its negative terminal connected at point 21. Tubes 14 and 15, and resistors 22 and 23 form the four arms of a Wheatstone bridge grounded at point 24 and connected at point 25 through line 26, resistor 29 and resistor 27 to ground 28. When tubes 14 and 15 are both in shadow or both in light, the bridge is in balance and the potential at point 25 is substantially that of the ground. Point 25 of the bridge is also connected through resistor 29 to the control grid 30 of tube 31, which is preferably of the gas-filled type in order to provide suitable amplification. When the bridge is in balance, the control grid or electrode is at substantially ground potential while the cathode of tube 31 is maintained at a sufficiently high positive potential to prevent ionization of tube 31, which, in turn, prevents any flow of current through its cathode circuit. The source of power for tube 31 is provided by means of battery 32 having its negative terminal grounded at point 33 and having a positive terminal at point 34, as indicated. Tube 31 receives its power through the line 35, grounded at 28, and provided with dividing resistors 36 and 37 to obtain the proper operating voltages for the tube 31.

When the bridge including tubes 14 and 15 is out of balance, or, in this case, when the casing is in the proper inspection position, tube 15 is in shadow and tube 14 is in light, placing a relatively high positive potential on point 25 which places a high positive potential on the control grid 30 which overcomes the normal negative bias of the tube thereby permitting the tube to ionize, provided the proper bias is placed on shield grid 38, as will be explained later. That is to say, when the bridge is unbalanced as described above, tube 31 is able to ionize and will ionize if tube 16 is darkened.

Tube 16 and load resistor 39, together with resistors 22 and 23, form another Wheatstone bridge. The bridge is grounded at 24. When the bridge, including resistor 39 and tube 16 is in balance or unbalanced in a negative direction of potential, a negative potential is placed on the screen grid 38 of tube 31 by means of load resistor 39, provided tube 16 is sufficiently illuminated. If there is not sufficient illumination on tube 16, the bias rectifier 40' connected across resistor 41 maintains sufficient negative bias on screen grid 38 in respect to the cathode potential to prevent tube 31 from ionizing even though a high positive potential is maintained on the control grid 30 when the bridge, including tubes 14 and 15, is out of balance as described above. Thus the grids of tube 31 are independently controlled by the two bridges.

When tube 16 is in shadow, for example when the smallest size casing is in position, the bridge, including tube 16 and resistor 39, is unbalanced, causing a high positive potential to be placed on the screen grid 38, thus permitting tube 31 to ionize. It will thus be seen that tube 31 will not ionize, unless the bridge, including tubes 14 and 15, is out of balance and the bridge, including tube 16 and resistor 39, is also out of balance. Thus screen grid 38 and control grid 30 are independently controlled by the two bridges heretofore described.

When tube 31 ionizes, causing a current to pass through its anode circuit, the relay coil 42 is energized, causing the relay switch 43 to be drawn over to contact point 44, actuating the indicator 1 which informs the operator that the casing is of size 1, or the smallest casing desired to be tested. As shown on the drawing, indicator 1 is hooked up to the relay switch in such a manner as to be inoperative until tube 31 ionizes. The source of power to indicator 1 is conventional and is not illustrated.

Tube 17 and resistor 40, together with resistors 22 and 23 form a third bridge which is grounded at point 24. Again, when this bridge is in balance, or unbalanced in a negative direction of potential, sufficient negative bias is imposed upon the screen grid tube 49, to prevent this tube from ionizing, since the cathode is connected to a point of relatively high positive potential between resistors 62 and 55. In the same manner as described above, if this bridge when in balance does not supply sufficient negative bias to tube 49, a bias rectifier 50, connected in parallel with resistor 51, maintains sufficient negative bias on tube 49 to prevent the tube from ionizing. The source of power for tube 49 is provided by connecting lead 52 to the positive potential of battery 32 at point 53. Line 52 is provided with dividing resistors 62 and 55 in order to provide the proper operating voltages for the tube 49.

In the same manner as described in connection with controlling the bias of tube 31, the control grid 53' of tube 49 is connected through resistor 54 to point 56 in order that the bridge circuit, including tubes 14 and 15, may provide the screen grid with its proper bias in the same manner that the control grid 30 in tube 31 is biased, as above described. The control grid 53' is connected to ground 48 through resistor 47. When the bridge circuit, including tubes 14 and 15, is unbalanced, a high positive potential is placed on tube 49 with respect to its cathode, thereby permitting the tube to ionize, providing a high positive potential is placed on screen grid 52'. A high positive potential is placed on screen grid 52' when the bridge, including tube 17 and resistor 40, is out of balance, in the same manner that the bridge, including tube 16 and resistor 39, provides the proper positive potential to cause current to pass through tube 31. Thus, when the bridge including tubes 14 and 15, and the bridge including tube 17 and resistor 40, are unbalanced, the screen grid 52' and control grid 53' of tube 49 have a high positive potential in respect to the cathode and the tube 49 ionizes, causing current to flow through the anode circuit which is connected to the source of D. C. potential at point 57. When such current flows through the anode circuit of tube 49, it energizes the relay coil 58, actuating the switch 59 and pulling it over to contact point 61 which closes the circuit actuating indicator 2 which informs the operator that a casing of the next increment in size is in the testing block. The relay switch 59 is of the double relay type and when it is pulled over to contact point 61, it opens the anode circuit of tube 31 which is connected to the source of D. C. potential at point 63, causing the relay coil 42 to be de-energized, which breaks the circuit of indicator 1 and indicator 1 is no longer actuated. Thus, the above means causes only one indicator to be actuated at any one time giving an accurate means for determining the size of casing in the testing block.

A method for testing casings is as follows: The operator inflates the casing in any suitable manner and places it in the test block 3. If the casing is properly placed in test block 3, the proper positive potential will be placed on grid 53' of tube 49, as previously explained. If it is of size 2, potential will be placed on screen grid 52' of tube 49 which permits tube 49 to ionize, causing indicator 2 to be actuated and preventing indicator 1 from being actuated. The operator may hold the casing in the inspection block by resting his hands on the handles 64 shown in Fig. 1.

Tubes 49 and 31 which are filled with a gaseous conducting medium, once ionized will continue to ionize when connected to a source of D. C. potential, unless the circuit is broken. For this purpose, the source of D. C. potential 32 is controlled by switch 60 which is opened momentarily prior to each inspection and then closed again. Such opening of the switch breaks the circuit and deionizes tubes 49 and 31. When the switch is closed, the tubes are ready to be ionized.

Switch 60 may be manually operated or may be connected to handles 64, in which case, handles 64 are movably attached to the inspection block so that when the operator places the casing in the inspection trough 4, a slight pressure on the handles will cause switch 60 to close and remain closed until pressure on the handles is released, when the switch opens breaking the circuit. The switch 60 may also be connected to a control near the operator's foot. The opening and closing of switch 60 may be done in a variety of manners and still be within the scope of my invention.

Although indicators 1 and 2 are shown as separate indicators, they may be embodied in one box in order to make it easy for the operator to determine what size tube is in the inspection block.

While I have disclosed the preferred embodiments of my invention, it is understood that the details may be varied and the description is not intended to limit the scope of my invention.

I claim as my invention:

Apparatus for inspecting a tubular casing comprising a block provided with a groove adapted to support a tubular casing so that a portion of the casing extends above the block, a tunnel in said block extending transversely of said groove and intersecting the groove so as to expose a part of the lower portion of a casing supported therein, means for projecting light through said tunnel to form a shadow image of said exposed part of the casing, means for projecting light across the upper surface of the block to form a shadow image of the portion of the casing which extends above the block, and means for comparing the diameter of a casing supported in the groove with that of a standard casing, and for insuring that the comparison is made only when the casing is in proper inspection position, said means comprising two photoelectric devices each arranged in a predetermined position relative to one of said shadow images, said positions being such that said devices are subjected to predetermined light and shadow conditions when said shadow images are formed by a standard casing correctly positioned in the block, an indicating means, a single electronic circuit comprising amplifying means having two independently controlled grids arranged for joint control of the flow of current in said circuit, means in said circuit responsive to a change in the flow of current in said circuit for controlling said indicating means, one of said photoelectric devices being connected to each of said grids for controlling the bias thereon so as to produce a change in the flow of current in said circuit, and thereby actuate said means for controlling the indicating means, only when said devices are subjected to said predetermined light and shadow conditions.

SAMUEL C. HURLEY, Jr.

REFERENCES CITED

The following references are of record in the file of this patent:

UNITED STATES PATENTS

| Number | Name | Date |
| --- | --- | --- |
| 2,085,671 | Powers | June 29, 1937 |
| 1,922,188 | Zworykin | Aug. 15, 1933 |
| 2,248,043 | Degnan | July 8, 1941 |
| 2,171,362 | Gulliksen | Aug. 29, 1939 |
| 2,173,164 | Hansell | Sept. 18, 1939 |
| 2,183,606 | Day | Dec. 19, 1939 |
| 2,188,159 | Rockwood | Jan. 23, 1940 |
| 2,033,645 | Parkhill | Mar. 10, 1936 |
| 2,280,948 | Gulliksen | Apr. 28, 1942 |